Figure 1:
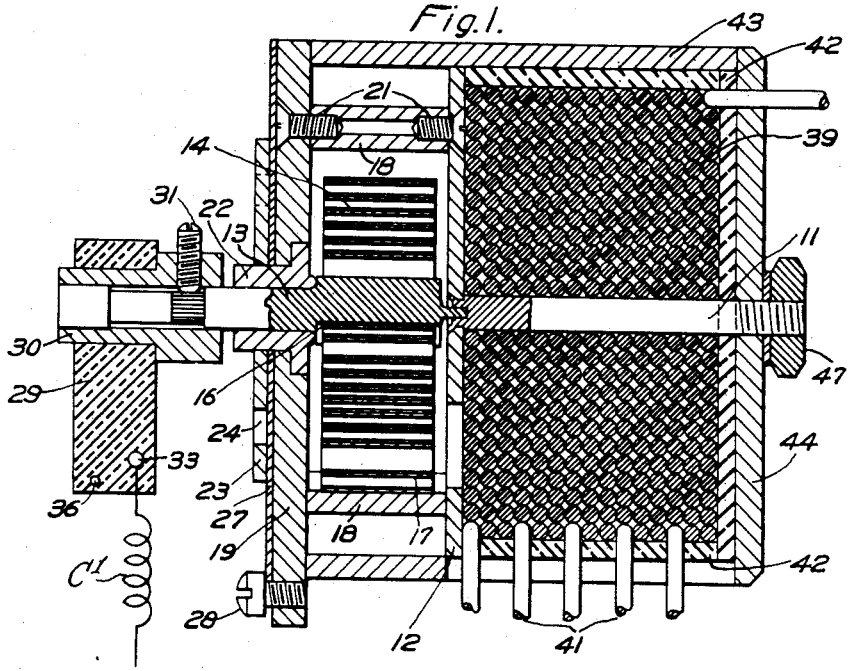

April 17, 1934.    L. N. CRICHTON    1,955,324

RELAY APPARATUS

Filed Dec. 3, 1930

WITNESSES.

M. D. Fowler

T. H. Davidson

INVENTOR

Leslie N. Crichton

BY Wesley G. Carr

ATTORNEY

Patented Apr. 17, 1934

1,955,324

UNITED STATES PATENT OFFICE 1,955,324

RELAY APPARATUS

Leslie N. Crichton, East Orange, N. J., assignor to Westinghouse Electric & Manufacturing Company, a corporation of Pennsylvania Application December 3, 1930, Serial No. 499,737

4 Claims. (Cl. 200—122)

This invention relates to protective apparatus for system or apparatus protection and embodies a new and novel type of thermal relay.

Heretofore, thermal relays utilized for overload and short circuit protection comprised, in general, a bi-metallic element, a heat storage mass and a heating element energized in accordance with the current traversing the system or apparatus. Such relays provide a time-delay of operation dependent on the magnitude of current flowing during an overload or short circuit.

In some instances, thermal relays have been provided with two energizing means, one responsive to overload conditions and the other responsive to short-circuit conditions, the one to provide a predetermined time-delay of operation and thus permit transient overload conditions, the other to provide substantially instantaneous operation in the event of short-circuit or fault conditions.

Thermal relays having only one energizing winding and a heat storage mass associated therewith, cannot respond faithfully to all current changes because of the time lag required for the heat to be transferred from the energizing winding to the heat storage mass. For short-circuit conditions, this time lag is highly objectionable since the tendency in modern relays and systems is to provide positive and substantially instantaneous relay operation, thereby resulting in better system stability.

To remedy this relay operation under short-circuit conditions, a second energizing winding means has been added to respond only to fault conditions. However, the thermal relay is still unavoidably prevented from responding faithfully to current variations because of the time lag required to transfer the heat to the heat storage mass.

The present invention eliminates this objectionable feature in a thermal-responsive relay and also provides for a very simple relay structure. To effect this simplification, the energizing winding of the relay is designed to function as a heat storage mass and the objectionable time lag of operation is thereby avoided.

The energizing winding comprises a plurality of turns of relatively low-resistance conducting material disposed in heat-delivering relation with respect to a suitable bi-metallic element. The conducting material may be copper, iron, nickel or some material having a proper specific resistance so that the winding may have considerable mass. This large mass is heated throughout, without substantial delay, on the occurrence of heavy overload conditions, while for light or transient overload conditions the heating of the mass is relatively gradual.

Obviously, in a thermal relay wherein the energizing winding is also designed to act as a heat storage mass, less heat is necessary to effect the actuation of a bi-metallic element and there is a resultant decrease in heat radiation. This type thermal relay is, therefore, more efficient and more simplified than the thermal relays of the prior art.

Figure 2:
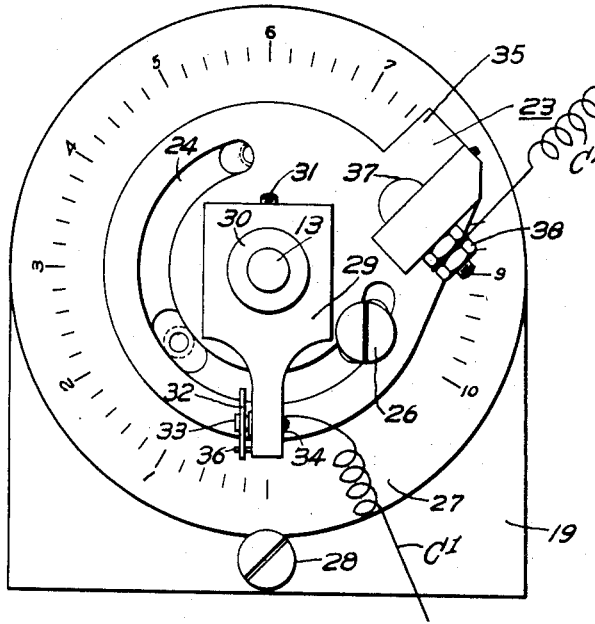
Figure 3:
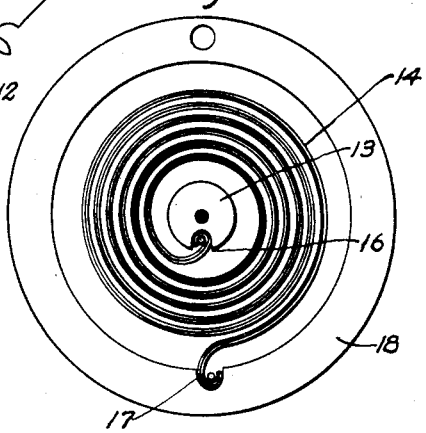

For a better understanding of the structure and operation of a thermal relay designed in accordance with the present invention, reference is made to the attached drawing wherein:

Figure 1 is a view in side elevation, partly in section, of a simplified thermal relay constructed in accordance with the present invention, Fig. 2 is a view in end elevation of the structure shown in Fig. 1, and Fig. 3 is a view of the thermal-responsive element shown in Fig. 1.

Referring more particularly to the drawing, a spindle 11, securely fastened at one end thereof to a disc or plate 12, is drilled or centered to form a bearing for one end of a rotatable shaft 13. A bimetal spring 14 has one end 16 thereof secured to the shaft 13 and the other end 17 secured to a supporting ring 18. The ring 18 is fastened to the disc 12 and to a front plate 19 by means of screws 21. The front plate 19 is provided with a bearing 22 for supporting the other end of shaft 13, and an adjustable stationary contact means 23 is provided with an arcuate slot 24 and clamping screw 26 for positioning the stationary contact means 23 with respect to a scaled plate 27, the plate 27 being secured to the front plate member 19 by means of screw 28.

A movable contact member 29 is secured to the shaft 13 by means of a bushing 30 and a set screw 31, and is provided with an electrical contact 32 secured by means of a bolt 33 and nut 34. The contact 32 is eccentrically and loosely mounted on the contact member 29 and is prevented from rotating by a guide pin 36. The movable contact member 29 is thus secured to the shaft 13 and is adapted to be moved in accordance with the movement of the bi-metallic spring 14. The adjustable stationary contact means 23 is provided with a contact 37 secured thereto by means of nuts 38 in a position to be engaged by the movable contact 32. The circuit to be controlled by the thermal relay is connected to the relay contacts by securing one conductor C1 of the circuit under the nut 34 and the other conductor C2 under one of the nuts 38.

The plate 27 is calibrated, as indicated in Fig. 2, and by means of a projecting portion 35 on the adjustable contact plate 23, the plate 23 may be moved to predetermine the distance through which the movable contact 32 must move before it engages the contact 37. Accordingly, the calibration of the relay may be readily and accurately set to take care of various overload or short-circuit conditions with respect to which protection is desired, and to change the effect of ambient temperature on the relay operation under certain conditions, as pointed out hereinafter.

A coil 39 disposed upon the spindle 11 is utilized as the energizing winding of the relay and is provided with a plurality of taps 41 for changing the number of effective turns and, therefore, predetermining the response value of the relay. The winding 39 comprises wire of relatively low-resistance conducting material and its large mass constitutes a heat storage mass which provides a substantially faithful heat indication for all values of current flowing therein. Suitable insulation 42 may be wrapped around the energizing winding 39.

A highly polished casing 43 is fitted over the energizing winding 39, the disc 12 and the bi-metallic element 14, and is firmly held in position against the front plate 19 by a cap 44 which functions to clamp the assembly together by means of a nut 47 cooperating with a threaded portion on the spindle 11.

The insulating material 42 has, preferably, non-heat radiating characteristics, and the case 43 is highly polished to minimize heat radiation from the energizing winding 39. The cap 44 is also designed to prevent heat radiation and the maximum possible amount of heat generated in and by the winding 39 is, therefore, available for affecting the bi-metallic spring 14.

From the foregoing description, it may be clearly seen that for any predetermined magnitude of current flowing in the energizing winding 39, the bi-metallic spring 14 responds to rotate the shaft 13 and contact member 29 in accordance with the heat stored in the winding 39. Obviously, for overload or short-circuit conditions the energization of winding 39 is increased and the heat stored therein is proportionately raised to effect the response of the bi-metal spring 14.

Any desired number of turns may be included in the energizing winding 39, merely by changing taps 41, and the effective response of the relay may thus be predetermined for any given magnitude of current flow. The stationary contact means 23 may also be adjusted to predetermine the effective energization of the winding 39 for closing the contact 32 and 37. Other obvious changes in the design of the relay may be made to predetermine the effective response of the relay, such as modifying the characteristics of the bi-metallic element and the provision of an energizing winding having different specific heat characteristics.

The provision of an adjustable stationary contact means 23, permits calibration of the relay in accordance with ambient temperature conditions. The present relay apparatus may be used for system or apparatus protection. Assuming the relay to be so positioned as to be influenced by the air used to cool a given machine, the relay contacts may be adjusted for actuation at the temperature which is considered dangerous for the machine. However, operating conditions incident to the protected apparatus, may not warrant the consideration of ambient temperature and the fixed contact of the relay may be positioned to provide relay operation at a temperature higher than the dangerous machine temperature. For example, assuming the dangerous machine temperature to be 100° C., the adjustably fixed relay contact may be positioned to respond at a temperature of 140° C. In this assumed example, a temperature change of 10° C. in the surrounding air will not affect the operation of the relay as much as if the temperature setting were 100° C. Obviously, under colder weather conditions, the same response setting of the relay will permit the machine or apparatus to assume a heavier load. This condition also exists where the relay temperature setting is made to correspond to the dangerous temperature of the machine to be protected, since the relay is affected by exactly the same conditions as the machine.

As is well known in the art, an overcurrent element having the contacts thereof connected in parallel with the contacts of the thermal-responsive relay, may be employed for protection against short-circuit conditions, and the thermal-responsive relay may be relied upon for accurate overload protection. However, a thermal relay designed in accordance with the present invention responds faithfully to all current energizations and, because of the large mass of the energizing winding, the heat is transferred to the bi-metallic element substantially without delay, upon the occurrence of heavy overload and short-circuit conditions, to effect the actuation of the relay.

Because of the novel feature of providing a thermal relay having an energizing winding designed to act in the capacity of a heat storage mass, and in view of the more accurate operation obtainable with this type of thermal relay over the prior art thermal relays, the advantages of this relay are obvious. The resulting relay structure is simple and, as pointed out hereinbefore, any predetermined response setting may be made with great facility.

Various modifications may be made in the construction disclosed without departing from the spirit and scope of the present invention, and it is desired, therefore, that no limitations shall be placed thereon other than those imposed by the prior art and set forth in the appended claims.

I claim as my invention:

1. In a thermal relay, a cylindrical casing comprising a tubular sleeve and a pair of end plates for closing the open ends thereof, a partition member of heat conductive material within said tubular sleeve whereby two compartments are defined, a coil of wire of compact formation within one of said compartments, heat insulating means disposed between said coil and the adjacent end plate and side walls, a thermo-responsive member disposed in the other compartment adjacent said heat conductive partition member, and an electrical contactor controlled thereby.

2. In a thermal relay, a cylindrical casing comprising a tubular sleeve and a pair of end plates for closing the open ends thereof, a partition member of heat conductive material within said tubular sleeve whereby two compartments are defined, a coil of wire of compact formation within one of said compartments, heat insulating means disposed between said coil and the adjacent end plate and side walls, a rotatable shaft, means for pivotally supporting said shaft between the partition member and the other end plate, a thermo-responsive member mounted on said shaft adjacent said partition member, and an electrical contactor controlled by said shaft.

3. In a thermal relay a closed cylindrical casing, a perforated partition member of conductive material for dividing said cylinder into two compartments, a coil of wire of compact formation within one of said compartments, heat insulating means disposed between said coil and the adjacent end wall and side walls, a rotatable shaft extending through the other end wall of the casing, a thermo-responsive member mounted on the inner end of said shaft adjacent said partition member, and electrical contact means mounted on the outer end of said shaft.

4. In a thermal relay a casing, a thermo-responsive element and a heating coil mounted therein, a shaft rotatable by said element and extending through one wall of said casing, a graduated disk mounted on said wall over said shaft in concentrically disposed relation, a second disk of smaller diameter concentrically mounted on said first disk, a stationary contact mounted on said second disk, a contact mounted on the outer end of said shaft to engage said stationary contact when the shaft is rotated by said thermo-responsive element, and adjustable means for securing said second disk whereby it may be set to various positions relative to the graduated disk to predetermine the engaging position of said contacts.

LESLIE N. CRICHTON.